United States Patent

[11] 3,597,092

[72] Inventor  Erik Niss
           Lidingo, Sweden
[21] Appl. No. 861,434
[22] Filed    Sept. 26, 1969
[45] Patented Aug. 3, 1971
[73] Assignee AGA Aktiebolag
[32] Priority  Oct. 9, 1968
[33]          Sweden
[31]          13576/68

[54] INSTRUMENT FOR MEASURING A PROJECTED DISTANCE
3 Claims, 2 Drawing Figs.
[52] U.S. Cl. .................................................. 356/156
[51] Int. Cl. .................................................. G01b 11/02
[50] Field of Search .......................................... 356/15, 156, 172

[56]          References Cited
              UNITED STATES PATENTS
2,195,168  3/1940  Foster ........................... 356/156
3,330,178  7/1967  Timson .......................... 356/156
              FOREIGN PATENTS
1,120,157  12/1961  Germany Primary Examiner—Ronald L. Wibert
Assistant Examiner—Orville B. Chew, II
Attorney—Larson, Taylor & Hinds ABSTRACT: For measuring the projected distance between a pair of points, an optical lens system is arranged with its optical axis parallel to the direction of projection. The axis is deflected in opposite directions towards a pair of deflectors causing perpendicular deflections into directions parallel to the axis. The spacing between the deflectors is adjustable and can be read off from a scale. The lens system is adjustable parallel to the adjustment of the deflectors.

Patented Aug. 3, 1971 3,597,092

3,597,092

INSTRUMENT FOR MEASURING A PROJECTED DISTANCE

BACKGROUND OF THE INVENTION

The present invention relates to an instrument for measuring the projected distance between a pair of points. Such measurements may become necessary or desirable in connection with finding the distance between two points or objects which are not easily accessible or which must not be touched.

PRIOR ART

Special microscopic devices or specially manufactured jigs have been proposed for use in such measurements. These methods of measuring are time-consuming and expensive.

An arrangement for distance measurement in which an optical axis of a lens system is deflected into opposite directions and then deflected back towards substantially the same direction for the purpose of measuring distance is known from German Pat. No. 1,120,157. However, the known arrangement does not serve for measuring a projected distance and does not operate with parallel rays for that purpose, instead, it measures the distance from the instrument to the point of convergence of the nearly parallel directions and the adjustment of the spacing between the deflectors serves to coordinate the precision of the measurement with the depth of focus of a camera on which the arrangement is placed.

SUMMARY OF THE INVENTION

The instrument according to the invention comprises as its essential features a lens system, whose optical axis is parallel to a predetermined direction of projection, primary deflecting means being provided for deflecting the optical axis of the lens system in opposite direction perpendicular to the optical axis. Secondary deflecting means cause perpendicular deflections back to the original direction and towards the points, the projected distance between which is to be measured. The spacing between the secondary deflecting means is adjustable and a scale is provided for reading off the same to obtain a measure of the projected distance.

THE DRAWING

DESCRIPTION OF EMBODIMENT

Figure 1:
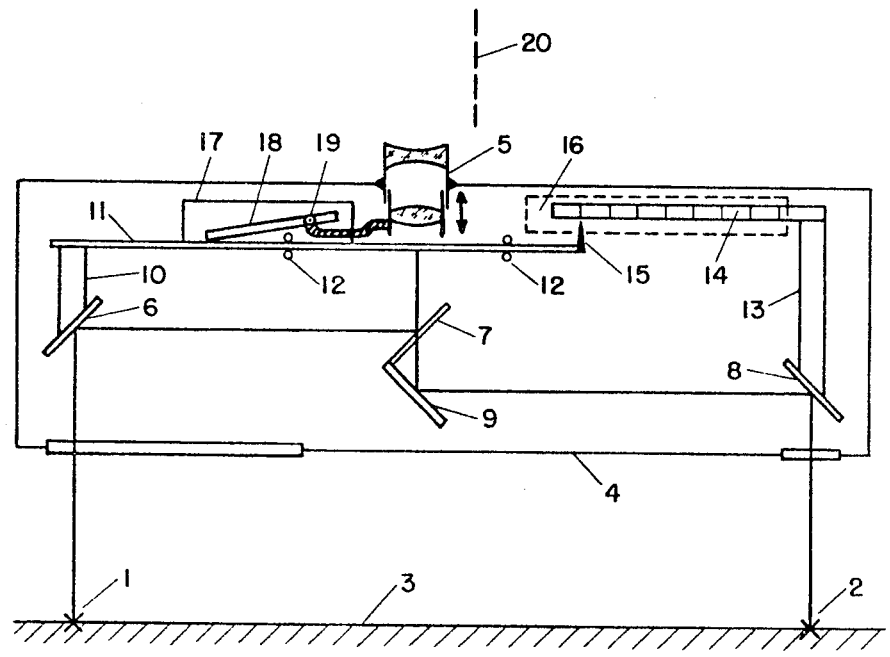
FIG. 1 is a general view of an embodiment of the invention.

Reference numbers 1 and 2 designate a pair of points, the projected distance between which is to be found. The instrument comprises a frame structure 4 supporting the various parts thereof. A lens system 5 serves to form coincident images of the two points 1 and 2 and is shown as comprising a negative and a positive lens adjustable relative to each other in well-known manner. The optical axis of lens system 5 forms a predetermined direction, and the instrument measures the distance projected parallel to this direction. The points 1 and 2 are assumed to be on some surface 3, and to find the distance proper between the points it is clear that the direction of projection must be at right angles to surface 3.

Provided in the optical axis of system 5 are a semitransparent mirror 7 and a totally reflective mirror 9 for deflecting the optical axis into opposite directions.

The deflected axis from mirror 7 reaches a secondary deflector 6 which causes a perpendicular deflection back to the original direction. In a similar manner, the deflected axis from deflector 9 reaches a secondary deflector 8 also causing a perpendicular deflection back to the original direction. Secondary deflectors 6 and 8 are attached to supports 10 and 13, respectively. Support 10 is attached to a carriage 11 which is slidable on rollers 12 and carries an index 15. Support 13 is fixed to a scale 14 cooperating with index 15 and visible through an aperture 16 for reading off the spacing between deflectors 6 and 8.

The adjustment of system 5 is coupled to movement of carriage 11 by means of a guide member 17 placed on carriage 11 and having a slot 18 cooperating with a pin 19 for adjusting the positive lens of system 5.

Figure 2:
FIG. 2 is a view of a modified arrangement of the lens system.
Figure 2:
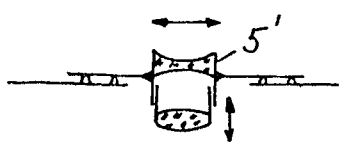

If the points 1 and 2 are not at equal distances from the instrument, for instance one of the points 2' is farther away, then in order to adjust the focusing of the images of both points 1 and 2', system 5 should be in a position such as indicated by the dash line 20 in FIG. 1. To this end, system 5 should be adjustable parallel to the adjustment of carriage 11. This modification is shown in FIG. 2 as a system 5' which is slidable to the right or the left, as shown.

OPERATION

The instrument is placed in such a position as to make point 2 be visible in the image field of system 5. Carriage 11 is then adjusted until the image of point 1 coincides with that of point 2 (or 2'). The spacing between deflectors 6 and 8 is read off from scale 14 and is equal to the projection of the distance between point 1 and 2 in a direction parallel to the optical axis. Simultaneously with adjustment of carriage 11, pin 19 adjusts system 5 for correct focusing. This coupling is not present in the FIG. 2 embodiment and it is clear that a more complicated coupling would have to be provided to conserve correct focusing when it is the projected distance between points 1 and 2' that is to be found. A prerequisite for such focusation is however that points 1 and 2' are at equal distances from system 5 and this is achieved by adjusting system 5' in FIG. 2 by an amount equal o half the distance between points 2 and 2' relative to FIG. 1.

I claim:

1. An instrument for measuring the projected distance between a pair of points, comprising:
   a lens system having its optical axis parallel to a predetermined direction of projection,
   primary deflecting means for deflecting said optical axis in opposite directions perpendicular to said optical axis,
   a pair of secondary deflecting means for perpendicularly deflecting said opposite directions back to said predetermined direction,
   means for adjusting the spacing of said secondary deflecting means,
   a scale for reading off said spacing,
   means for adjusting the back focal length of said lens system, and
   coupling means connected between said focal-length-adjusting means and said spacing-adjusing means.

2. An instrument according to claim 1, in which said spacing-adjusting means comprises a carriage supporting one of said secondary deflecting means and movable in said opposite directions.

3. An instrument according to claim 1, in which said lens system is adjustable in a direction parallel to the direction of adjustment of the spacing of said secondary deflecting means.